United States Patent [19]
Johnson et al.

[11] Patent Number: 5,618,057
[45] Date of Patent: Apr. 8, 1997

[54] CONTINUOUSLY VARIABLE CONTROLLED ORIFICE INFLATOR

[75] Inventors: Kelly B. Johnson, Layton; Brett Hussey, Bountiful, both of Utah

[73] Assignee: Morton International, Inc., Chicago, Ill.

[21] Appl. No.: 529,181

[22] Filed: Sep. 15, 1995

[51] Int. Cl.⁶ .................................................. B60R 21/26
[52] U.S. Cl. ......................... 280/736; 280/742; 137/71; 137/543.15; 222/3
[58] Field of Search ................................... 280/736, 737, 280/740, 741, 742; 137/71, 543.15; 222/3

[56] References Cited

U.S. PATENT DOCUMENTS

| | | | |
|---|---|---|---|
| 533,806 | 2/1895 | Hesketh et al. ........................ | 137/71 |
| 3,638,964 | 2/1972 | Chute ..................................... | 280/736 |
| 4,021,058 | 5/1977 | Suzuki et al. ......................... | 280/737 |
| 4,172,465 | 10/1979 | Dashner .............................. | 137/543.15 |
| 5,195,777 | 3/1992 | Cuevas ................................. | 280/736 |
| 5,257,817 | 11/1993 | Cuevas ................................. | 280/736 |

*Primary Examiner*—Brian L. Johnson
*Assistant Examiner*—Peter C. English
*Attorney, Agent, or Firm*—Charles N. Lovell; Gerald K. White

[57] ABSTRACT

An air bag inflation which includes a gas source and a gas outlet opening for allowing flow of gas from the gas source into the air bag wherein the flow of gas is controlled with a valve assembly including a piston disposed in a cylinder and features a piston against which the gas acts to cause movement of the piston in a first direction in the cylinder to provide an increased flow of gas through the gas outlet opening and further includes a spring disposed in the path of movement of the piston so that as the piston moves in the cylinder the spring provides resistance to the movement of the piston.

5 Claims, 2 Drawing Sheets

CONTINUOUSLY VARIABLE CONTROLLED ORIFICE INFLATOR

CROSS-REFERENCE

This application is related to application Ser. No. 08/528,972 filed on even date herewith, entitled "Pintle Controlled Orifice Inflator" (Morton Docket 2530-21-00) by the same inventors herein.

BACKGROUND OF THE INVENTION

1. Technical Field

The present invention relates to a hybrid air bag inflator, and more particularly to apparatus for controlling the rate of gas flow from a hybrid air bag inflator.

2. Description of the Prior Art

Air bag inflatable restraint systems commonly include an air bag and an inflator for providing gas to inflate the air bag. In hybrid air bag or augmented stored gas inflator systems a quantity of gas is stored under pressure in the inflator. Upon actuation of the inflator, the gas is released and directed into the air bag to effect its inflation. In vehicle restraint systems including an air bag, it is desirable to control the operating pressure in the air bag to ensure the desired amount of inflation at the desired time. Controlling the rate of flow of gas into the air bag controls bag inflation. Valving is typically used for controlling gas flow from the inflator. U.S. Pat. No. 3,638,964 discloses a moveable member for controlling the release of gas into an air bag. A quantity of silicone oil or grease is forced through an outlet to retard and thereby control movement of the moveable member. U.S. Pat. No. 5,195,777 discloses a valve assembly for controlling the flow of gas out of an inflator. The valve assembly includes a piston slidably received in a cylinder and a crushable honeycomb disposed in the path of movement of said piston for controlling movement of said piston in said cylinder.

SUMMARY OF THE INVENTION

The present invention is directed to an apparatus for inflating vehicle air bag restraint systems. The apparatus comprises a gas generator including a diffuser region and means for defining controlled (choked) gas outlet opening orifices in said diffuser region where the gas is turned and exits the generator to inflate the air bag. The means defining said gas outlet orifices includes a piston located in the diffuser region where the gas exits the generator. The piston is spring loaded with any spring-like material which allows motion of the spring relative to the diffuser. As the piston moves under pressure, from the generated gases it slides past the controlling orifices opening up the flow area, thus changing the cross-sectional flow area of the orifices over a continuously variable range. The operational pressure and mass flow rate from the generator is directly dependent on the flow area of the controlling orifices. When the gas generator encounters higher operating temperatures, the burning rate and pressure tend to increase. The piston controlled orifices will reduce such pressure increases by opening up the controlling orifices, thus equalizing the performance of the gas generators as a function of temperature. Similar behavior occurs during cold operation when pressures and burn rates are lower. Under these conditions, less flow area is opened up, and thus more pressure is created by the combustion of the pyrotechnic. The inflator therefore acts more like an ambient shot than a cold shot. The spring can initially be placed under load, ie. biased to provide more of a delay, for the obtention of certain tuning parameters.

BRIEF DESCRIPTION OF THE DRAWINGS

The foregoing and other features of the present invention will become apparent to one skilled in the art upon a consideration of the following detailed description of the invention with reference to the accompanying drawings.

DESCRIPTION OF PREFERRED EMBODIMENT

Figure 1:
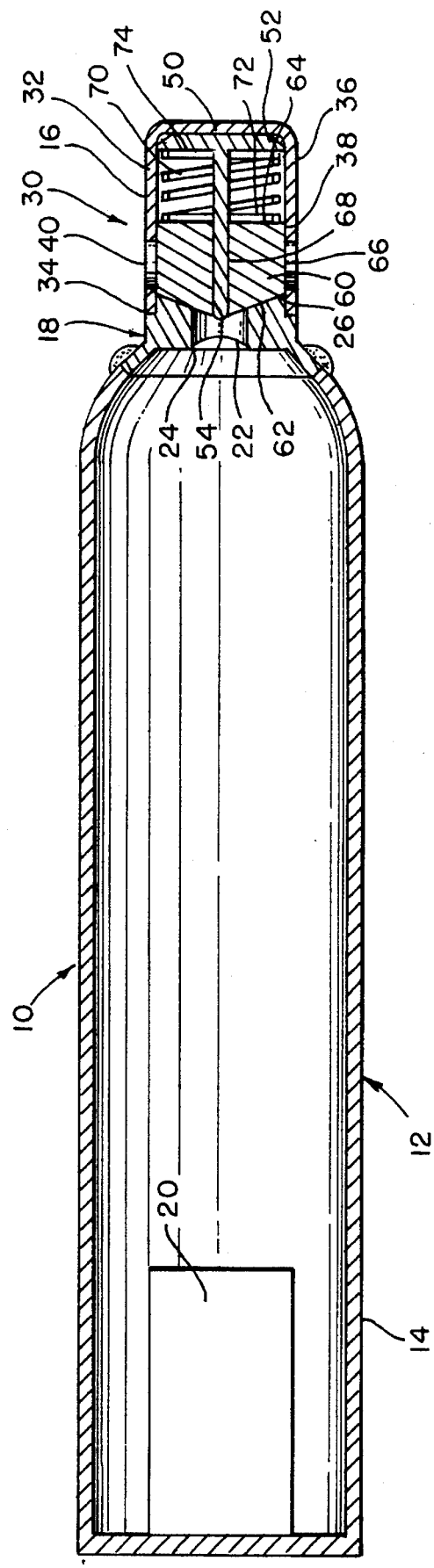
FIG. 1 is a longitudinal sectional view of an inflator embodying the present invention.

The present invention relates to an air bag inflator and particularly to an inflator for inflating an air bag to protect the passenger of a vehicle. The present invention is applicable to various inflator constructions. As representative of the present invention, FIG. 1 illustrates an inflator 10 for inflating an air bag (not shown) to protect passengers of a vehicle. The inflator 10 is an augmented inflator having a quantity of gas stored in a container in the inflator, usually under pressure. The inflator includes an initiator and a quantity of combustible material disposed in the container. Upon actuation of the inflator, the initiator ignites the combustible material, which generates heat to raise the pressure of the gas stored in the container. The combustible material also generates additional gas to augment the gas stored in the container. The stored gas and the gas generated by the combustible material are directed into the air bag to cause it to inflate. It should be understood that the present invention could be embodied in an inflator which uses only combustible material to generate gas, rather than in an augmented inflator.

The inflator 10 includes a quantity of gas stored under pressure in container 12. The gas is preferably argon, although other gases such as nitrogen or air could be used. The container 12 includes a housing 14 and a diffuser 16, which is attached to housing 14 by attachment boss 18. The diffuser 16, attachment boss 18 and housing 14 are welded together. An initiator assembly 20, which includes an initiator and a quantity of combustible gas generating material is disposed within container 12 adjacent one of its ends. A burst disk 22 seals an opening 24 in the attachment boss 18. Diffuser 16 is cup-shaped with radial holes (controlling orifices) 40 to direct gases from the inflator into the air bag.

The inflator 10 includes a valve assembly 30 for controlling the flow of gas out of the inflator. The valve assembly 30 includes a cylinder 32 formed as part of the diffuser 16. The cylinder extends axially outward from a radially extending portion 34 of attachment boss 18. The cylinder 32 has a cylindrical outer surface 36 and a cylindrical inner surface 38 between which extend a plurality of radial gas outlet openings 40.

A piston guide 50 is secured in the cylinder 32. The piston guide 50 has a radially extending base portion 52 and a guide pin 54 projecting axially from the base portion. The guide pin 54 has a cylindrical outer surface 56 extending parallel to the inner surface 38 of cylinder 32.

A piston 60 is disposed in the cylinder 32. The piston 60 has a radially extending surface 62 facing axially inward toward the burst disk 22. The piston 60 also has a radially extending surface 64 facing axially outward toward the piston guide base 52. The piston 60 has a cylindrical outer surface 66 in sliding engagement with the inner surface 38 of the cylinder 32, and a cylindrical inner surface 68 defining a central opening through which the guide pin 54 extends.

A coil spring 70 is disposed in cylinder 32. The material used for making the spring is not critical. Any material typically used for springs and which allows motion of the spring and piston relative to the diffuser can be employed in making the spring 70, eg. spring steel, brass, etc.. Coil spring 70 can be cylindrical or conical in shape and can be made with a circular or rectangular cross section.

The axially inner end 72 of the spring is in abutting relation with surface 64 of piston 60. The axially outer end 74 of spring 70 is in abutting engagement with the piston guide base 52. In a typical installation, the guide pin 54, spring 70 and piston 60 are placed into the diffuser 16. The diffuser 16 is then placed onto shoulder 26 of attachment boss 18 and the diffuser is welded to the attachment boss 18 by any conventional welding process. The attachment boss 18 is initially welded onto housing 14, as shown in FIG. 1. A small amount of spring preload is desirable to prevent the rattle of loose parts. The amount of preloading can be advantageously used as a tuning parameter that allows tailoring of the inflator performance to meet the specific needs of each design application.

Figure 2:
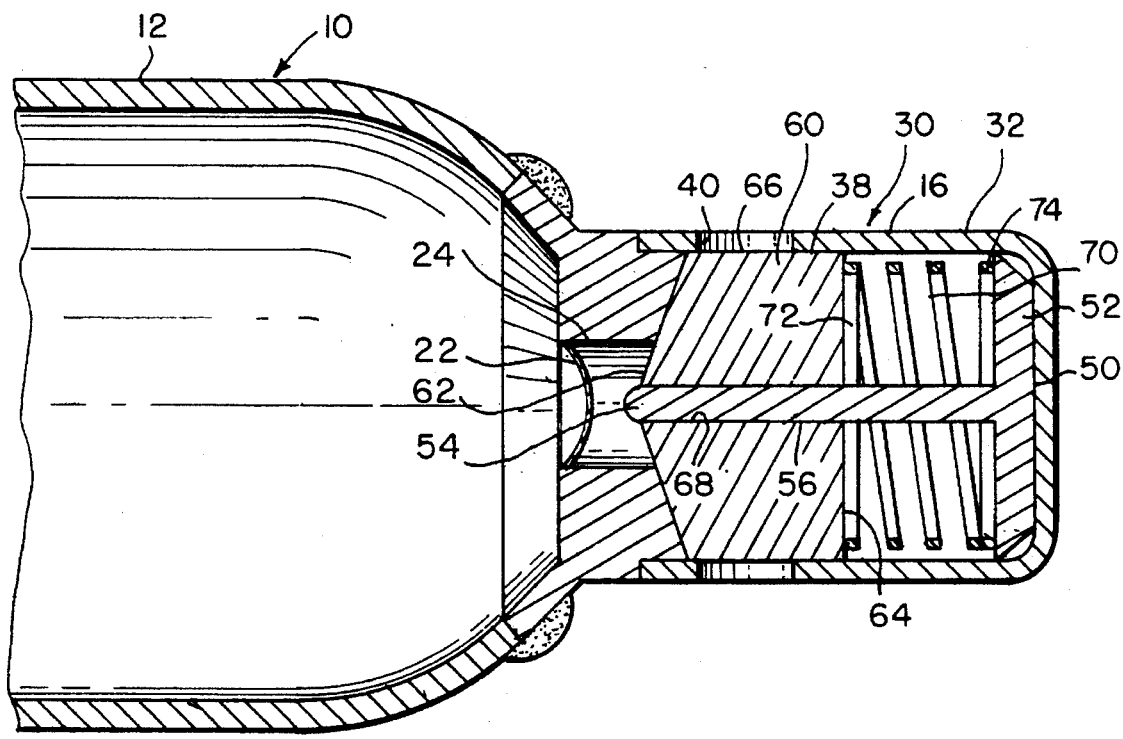
FIG. 2 is an enlarged view of a portion of FIG. 1 showing a valve assembly in closed position.

FIG. 2 illustrates the parts of the valve assembly 30 in a first condition prior to activation of the inflator 10. The burst disk 22 is intact, maintaining the gas in the container. The piston 60 is disposed at the axially inner end of the cylinder 32 between the opening 24 and the gas outlet openings 40. The spring 70 is disposed between the piston 60 and the piston guide base 52.

Figure 3:
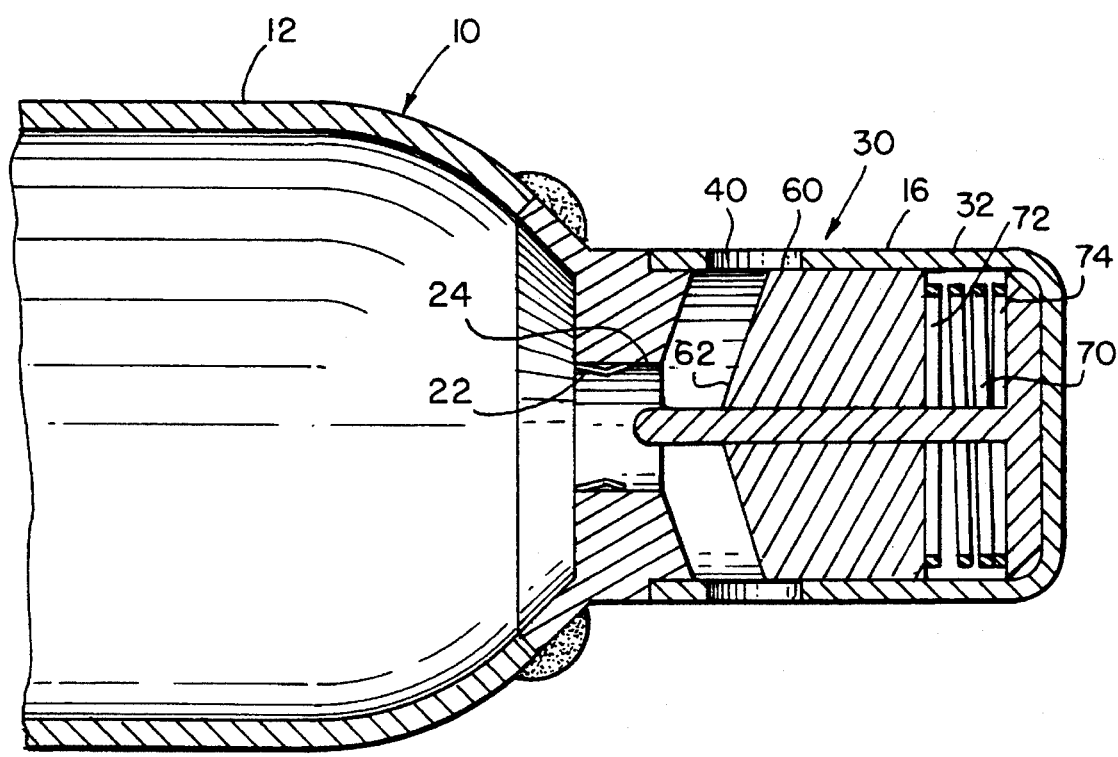
FIG. 3 is an enlarged view of a portion of FIG. 1 showing a valve assembly in open position.

Upon actuation of the inflator 10, the initiator assembly heats the gas in the container 12 to raise its pressure. The initiator assembly 20 also generates additional gas to augment the gas stored in the container 12. When the gas pressure in the container 12 reaches a predetermined level, the burst disk 22 bursts, as shown in FIG. 3. The gas contacts the surface 62 of piston 60, causing the piston to move in a first direction in the cylinder 32, from the position shown in FIG. 2 to the position shown in FIG. 3.

The spring 70 is disposed in the path of movement of the piston 60 with the coils of the spring oriented transversely to the path of movement. The spring 70 resists and slows movement of the piston 60 but does not block such movement. The force exerted by the moving piston 60 on the spring 70 causes the spring to be compressed between the moving piston and the piston guide base 52. The spring 70 compresses from its axially inner surface 72 to its axially outer surface 74. When the piston 60 has completed its path of movement in the cylinder 32, the spring 70 is compressed, as is seen in FIG. 3.

As the piston 60 moves in the cylinder 32, it exposes the gas outlet openings 40. The gas from the container 12 flows through the opening 24 and through the gas outlet openings 40. The gas then flows into the air bag (not shown) to cause its inflation.

As the piston 60 moves in the cylinder 32, the piston exposes an increasing amount of gas exhaust area through the gas outlet openings 40. The speed of movement of the piston 60 is controlled by the spring 70. As the piston 60 travels down the cylinder 32 the spring provides resistance to the movement of the piston. The construction of spring 70 can be varied to control the compression rate of the spring and thus the rate of movement of the piston 60 in the cylinder 32. Thus, by selecting an appropriate spring, it is possible to control the rate of the gas flow from the inflator 10 into the air bag.

The spring acts in a linear fashion to influence the burning behavior through the entire combustion process. Early on, the spring will resist piston movement; however, when the pressure begins to decline, the piston will move back over the diffuser orifices, slowing the mass flow out of the inflator. This will result in a higher inflator pressure than would be provided with a constant controlling orifice area and therefore faster combustion. This will provide a sustained period at relatively constant pressure, better performance after peak pressure is reached, and a quicker tailoff of the inflator pressure. In addition, the device may allow use of a simpler pyrotechnic shape to achieve neutral-burn characteristics. In brief, the spring loaded device of the present invention advantageously influences performance throughout the entire combustion event in contrast to prior art devices, such as the device of U.S. Pat. No. 5,195,777 which influences performance only up to the time of peak inflator pressure.

From the above description of the invention, those skilled in the art will perceive improvements, changes and modifications in the invention. Such improvements changes and modifications within the skill of the art are intended to be covered by the appended claims.

What is claimed is:

1. An inflator for providing gas to inflate an air bag comprising:

a gas source stored under pressure in a container, said container having a gas outlet end, said container including a diffuser shaped in the form of a cylinder affixed to said gas outlet end of said container, means for defining a gas outlet opening in said diffuser to allow flow of gas from said gas source into said air bag to cause said air bag to inflate, and valve means for controlling flow of said gas through said diffuser gas outlet opening, said valve means comprising a spring loaded piston slidably contained within said cylinder, said piston having a first radially extending surface against which said flow of gas moves said piston in a first direction to allow increased flow of gas through said gas outlet opening, said valve means including a coil spring disposed in the path of movement of said piston for controlling the movement of said piston in said cylinder.

2. Apparatus as claimed in claim 1 wherein said diffuser chamber comprises a longitudinally extending wall defining the path of movement of said piston, said diffuser having an axially inner cylinder portion in which said gas outlet opening is formed, said piston being disposed in a first position in said inner cylinder portion prior to actuation of said apparatus, said cylinder including an axially outer portion in which said coil spring is disposed, said gas acting to move said piston in said first direction from a first position to a second position at least partially in said axially outer portion of said cylinder against the resistance of said coil spring.

3. Apparatus as defined in claim 2 wherein said piston is in the shape of an annulus, having a central axially extending opening, said coil spring having an axially extending central opening, said diffuser having a guide pin fixed to a piston guide base located in an end of said diffuser, said pin extending through said central opening in said piston and said coil spring to guide movement of said piston in said diffuser.

4. Apparatus as defined in claim 3 wherein said coil spring comprises a plurality of coils extending transverse to said first direction including an axially inner coil in abutting relationship with the piston and an axially outer coil in abutting relationship with the piston guide base, movement of said piston in said first direction acting to compress said coils.

5. Apparatus as defined in claim 3 wherein said coil spring is a conical helical spring.

* * * * *

UNITED STATES PATENT AND TRADEMARK OFFICE
CERTIFICATE OF CORRECTION

PATENT NO. : 5,618,057
DATED : 8 April 1997
INVENTOR(S) : Kelly B. Johnson and Brett Hussey It is certified that error appears in the above-indentified patent and that said Letters Patent is hereby corrected as shown below:

At title page, Abstract, line 1, "inflation" should be
--inflator--.

At column 4, lines 50 and 51, "diffuser chamber comprises" should be
--diffuser comprises--.

Signed and Sealed this

Thirtieth Day of September, 1997

Attest:

BRUCE LEHMAN

*Attesting Officer*  *Commissioner of Patents and Trademarks*